United States Patent [19]

Volk

[11] 4,082,000
[45] Apr. 4, 1978

[54] DISPOSABLE COOKING THERMOMETER STRUCTURE

[76] Inventor: Anthony J. Volk, 173 E. Syracuse St., Turlock, Calif. 95380

[21] Appl. No.: 675,290

[22] Filed: Apr. 9, 1976

[51] Int. Cl.² .............................................. G01K 11/06
[52] U.S. Cl. ..................................... 73/358; 116/114.5
[58] Field of Search ................. 73/352, 358; 24/90 B, 24/143 B, 201 A; 292/67; 99/342; 116/114.Y, 114.5; 337/409, 411

[56] References Cited

U.S. PATENT DOCUMENTS

| | | | |
|---|---|---|---|
| 2,554,521 | 5/1951 | Canter | 292/317 |
| 2,653,401 | 9/1953 | Sutherland | 292/307 R |
| 3,548,780 | 12/1970 | Kliewer | 73/358 X |
| 3,656,452 | 4/1972 | Kliewer | 73/358 X |
| 3,713,416 | 1/1973 | Volk | 73/358 X |
| 3,759,103 | 9/1973 | Volk | 73/358 |
| 3,765,249 | 10/1973 | Bissell | 73/431 |

Primary Examiner—Richard C. Queisser
Assistant Examiner—John S. Appleman
Attorney, Agent, or Firm—Alvin E. Hendricson

[57] ABSTRACT

An improved structure for a disposable meat and poultry thermometer has a unitary top barrel closure extending laterally outward from a barrel beneath an indicating stem latched in storage position by a prong on the stem engaging the top closure. Lifting the outer end of the stem releases the latch so that a compression spring within the barrel urges an inner axial stem extension into a front barrel bore containing a material having a predetermined softening temperature so that the stem moves inwardly of the barrel as the inner barrel end temperature increases. Upper stem markings indicate thermometer temperature preferably in terms of the degree to which meat or the like is cooked.

1 Claim, 7 Drawing Figures

U.S. Patent  April 4, 1978  4,082,000
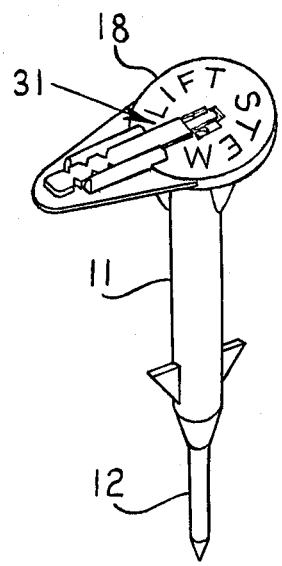
FIG. 1
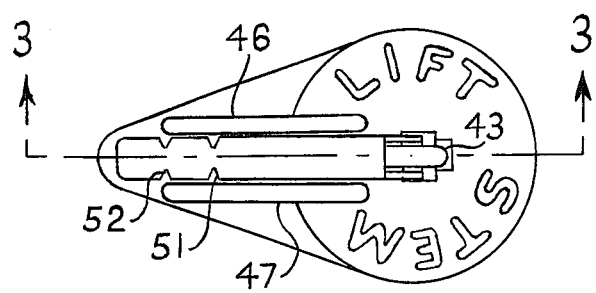
FIG. 2
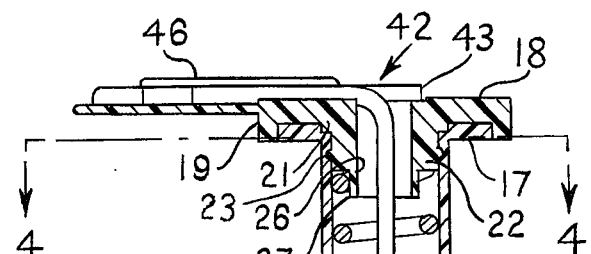
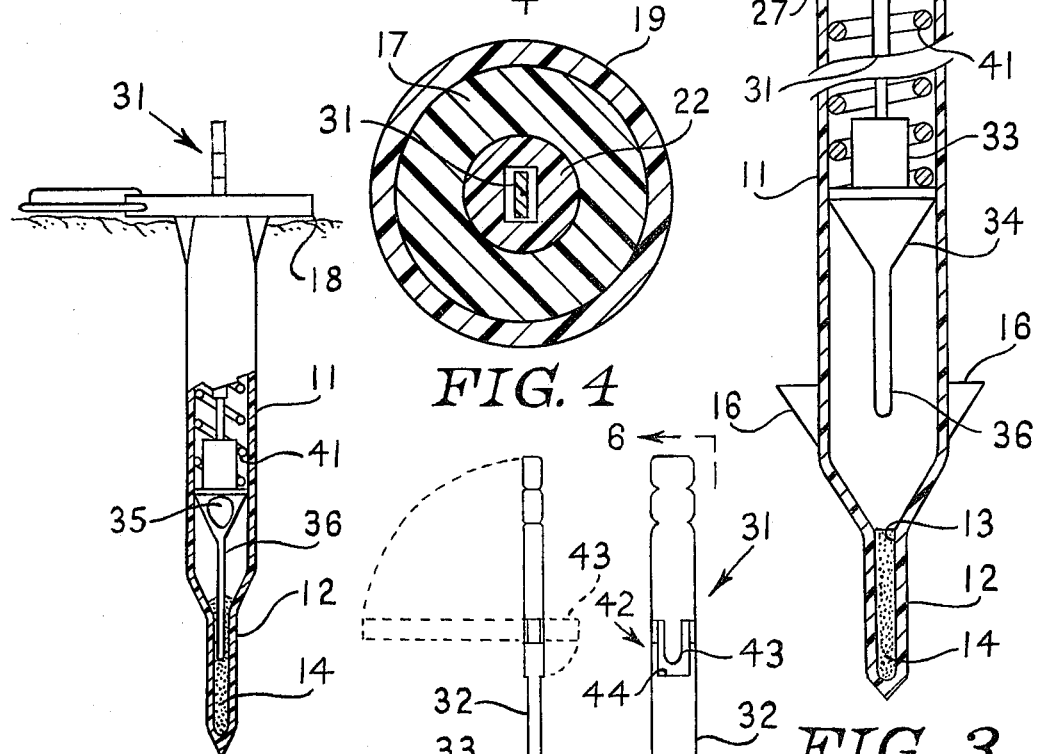
FIG. 3
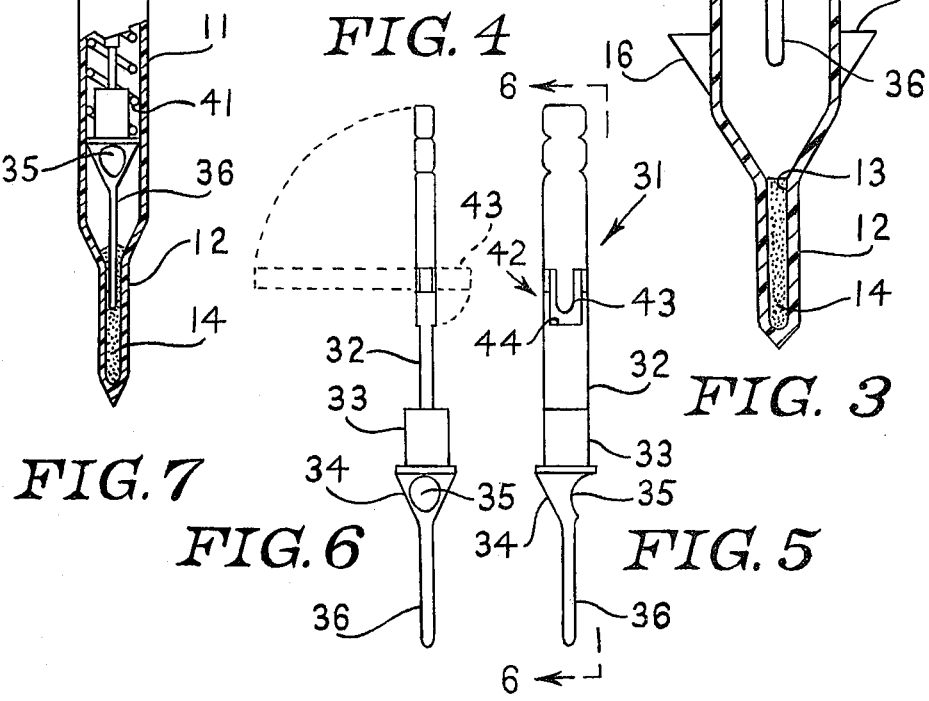
FIG. 4
FIG. 7
FIG. 6
FIG. 5

DISPOSABLE COOKING THERMOMETER STRUCTURE

BACKGROUND OF INVENTION

There have been developed and marketed a wide variety of meat and poultry thermometers adapted to be inserted prior to cooking and to indicate the degree of cooking by the internal temperature of the meat or poultry. An advancement in this field is the disposable poultry thermometer having an indicating rod or stem that is visually movable. One kind of disposable thermometer of this general type is the pop-up thermometer which generally incorporates a heat fusible latch to retain a spring loaded plunger or the like within a thermometer barrel so that upon attainment of a predetermined thermometer temperature the latch is released and the rod or plunger pops up to indicate completion of cooking. An alternative type of disposable cooking thermometer as shown in U.S. Pat. No. 3,759,103 includes an indicating rod or the like extending from the thermometer barrel and movable into the barrel under spring pressure as a material within the thermometer softens with increasing temperature.

The present invention comprises an improvement in the structure of the latter type of disposable cooking thermometers particularly with regard to latching of the indicating stem or rod in storage position of the thermometer.

SUMMARY OF INVENTION

The present invention comprises particular structural improvements in the disposable cooking thermometer of U.S. Pat. No. 3,759,103 and reference herein made to such patent. The structure of the foregoing thermometer generally comprises a cylindrical barrel having a thin walled hollow forward extension with a material disposed in the bore of such extension that softens at a predetermined temperature. Internally of the barrel, there is provided an indicating rod or stem having an axial extension bearing upon the material in the aforementioned bore with a spring internally of the barrel compressed between an indicating rod flange or the like and a rear barrel closure member so as to urge the indicating rod into the barrel. For storage and shipment of meat or poultry having the thermometer hereof inserted therein, the indicating rod is partially withdrawn from the barrel and bent over into a latched position so that the stem does not protrude from the meat or poultry. The thermometer is readied for use by lifting the outer stem end to unlatch the stem.

The present invention provides an improvement in stem construction wherein the stem itself is cut out to form an integral prong intermediate the ends of the stem so that, when the stem is withdrawn against the spring pressure and the rod is bent over in an area of reduced cross-section, the prong will pivot outwardly to engage the unitary top barrel closure for latching the stem in storage position. The indicator stem is provided with indicia thereon to indicate successively higher degrees of temperature of the thermometer and internally of the thermometer the stem is provided with a cylindrical spring engaging portion and a conical forward portion at the butt of the axial extension. This conical portion is indented for receiving molten material slowly forced from the axial bore of the barrel as such material is heated so that the axial stem extension may be cylindrical of a diameter only slightly less than that of the barrel bore.

The improved structure of the present invention furthermore provides a unitary top barrel closure member which resiliently clips to the top of the barrel for closing same about the indicator stem extending through this closure member. The closure member extends laterally of the barrel completely beneath the portion of the stem bent over in latched stem position and has ridges along the upper surface thereof beside the stem in this position to guard against inadvertent unlatching of the stem. This top closure member furthermore is apertured to spell out instructions for unlatching the thermometer and is preferably formed of a material of a different color from that of the barrel flange immediately beneath same so that the instructions are highly visible.

DESCRIPTION OF FIGURES

The present invention is illustrated as to a single preferred embodiment thereof in the accompanying drawings, wherein:

FIG. 1 is a perspective view of a disposable cooking thermometer incorporating the structural improvements of the present invention;

FIG. 2 is a top plan view of the thermometer of FIG. 1;

FIG. 3 is a vertical sectional view of the thermometer taken in the plane 3 — 3 of FIG. 2;

FIG. 4 is a horizontal sectional view taken in the plane 4 — 4 of FIG. 3;

FIG. 5 is a side elevational view of the indicator stem of the present invention;

FIG. 6 is another side elevational view of the indicator stem of the present invention taken in a plane rotated 90° from that of FIG. 5, as indicated by the plane 6 — 6 in FIG. 5; and FIG. 7 is a side elevational view of the thermometer of FIG. 1 inserted in a piece of meat for example being cooked and having the lower portion of the barrel broken away to indicate the internal operation of the invention at increasing temperatures.

DESCRIPTION OF PREFERRED EMBODIMENT

The present invention comprises a disposable cooking thermometer of the type generally disclosed in U.S. Pat. No. 3,759,103 and having a simple improved structure. Referring to the drawings, there will be seen to be provided by the present invention a hollow cylindrical barrel 11 tapering inwardly at the lower end thereof with a cylindrical axial extension 12 extending therefrom and having a small bore 13 axially thereof. The barrel 11 has a thin wall at least in the axial extension 12 thereof for ready transmittal of heat therethrough and this axial extension is substantially filled with a material 14 that softens and melts at predetermined elevated temperatures. Such materials are well known in the art and may comprise Cerro metal, Woods metal or any of a variety of metal alloys or compounds of bismuth, tin and the like having a desired predetermined softening temperature.

The barrel 11 of the thermometer hereof is adapted to be inserted in the flesh of poultry and meat to be cooked and to remain therein during cooking. The temperature responsive material 14 will thus be subjected to the interior temperature of the poultry or meat being cooked and consequently will soften or become plastic at a desired degree of cooking thereof. Small fins 16 may be provided on the sides of the barrel extending laterally outward therefrom with the under surfaces of the fins being tapered as shown so that these fins readily penetrate meat or poultry and serve to hold the thermometer barrel therein during cooking.

The thermometer barrel 11 is additionally provided with an external flange 17 about the upper open end of the barrel. A top closure member 18 fits over this flange 17 and closes the upper end of the barrel. The closure member 18, as shown in FIGS. 1 to 3 of the drawings, has a generally circular configuration with one side thereof extending laterally outward for reasons described below. The circular portion of the closure member 18 fits upon the barrel flange 17 with a depending rim 19 fitting about the flange and a central circular boss 21 fitting into a central circular indentation in the flange. The closure member 18 also includes a depending cylindrical boss 22 adapted to slidably engage the interior of the hollow barrel 11 at the upper open end thereof. A circumferential ring or protuberance 23 about the cylindrical boss 22 snaps into a mating depression about the interior of the barrel adjacent the top open end thereof so as to secure the closure member 18 onto the top of the barrel. The closure member 18 is also provided with a rectangular opening 26 therethrough, axially aligned with the barrel 11.

There is provided as a further portion of the present invention an indicating stem or rod 31 disposed within the hollow cylindrical barrel 11 and having the upper end thereof extending through the closure member opening 26. The upper portion of this stem 31 is formed as an elongated flat strip 32 terminating at the bottom thereof in a cylindrical boss 33 resting upon the upper flat surface of an inverted conical portion 34 having an elongated axial extension 36 depending from the point of the cone. The upper part of the conical portion 34 of the stem is dimensioned to slidably engage the interior of the barrel 11 and the axial stem extension 36 is dimensioned to slidably engage the axial bore 13 and the barrel tip 12 with a slight clearance so that the material 14 may slowly flow upwardly alongside the axial stem extension 36 as the material 14 is softened with elevated temperature. The outer diameter of the conical portion 34 of the stem 31 is substantially equal to the inner diameter of the barrel 11, so that the stem is slidably disposed in the barrel with the extension 36 aligned with the bore 13 in the barrel. Provision is made for urging the stem inwardly of the barrel and this is herein accomplished by a compression spring 41 disposed about the stem above the conical portion 34 and beneath the cylindrical boss 22 of the closure member 18. The spring fits about the cylindrical boss 33 of the stem and a shoulder is formed about the bottom of the closure boss 22 to define a small depending cylindrical extension 27 about which the upper end of the spring is disposed. The spring 41 is compressed in the barrel so as to urge the stem inwardly of the barrel.

The indicating stem or rod 31 of the present invention is adapted to be forced inwardly of the barrel by the spring 41 in the operating position of the stem and is adapted to be maintained in a storage position when not in use. In storage position, the stem is drawn upwardly to extend a substantial amount thereof from the upper end of the barrel, and the stem is then bent over 90° to lie upon the lateral extension of the closure member 18. In order to maintain the stem in storage or latched position, there is provided latching means 42 comprised as a prong or finger 43 defined by U-shaped cutout 44 in the upper portion 32 of stem 31. The thickness of upper portion of stem 32 is reduced on both sides of the upper portion of the cutout 44 so that the stem will readily bend in this area.

The stem 31 of the present invention is placed in storage or latched position by grasping the upper end of the stem extending from the closure member 18 and pulling the stem upwardly against the force of the spring 41 until the prong 43 is exposed to view. The stem is then bent over onto the laterally extended portion of the closure member 18 so as to pivot the prong 43 outwardly of the stem whereby the prong extends over a portion of the top of the closure member 18. There may, in fact, be provided a small cutout into which the prong 43 fits in the top of the closure member, as indicated in FIG. 3, and it will be appreciated that the upper portion of the stem is then constrained to lie flat against the top of the closure member 18, as indicated in FIGS. 2 and 3. There are provided a pair of low upstanding walls or ridges 46 and 47 on the laterally extended portion of the closure member with the stem fitting therebetween in latched or storage position. These walls then protect the stem from being inadvertently raised. In order to move the stem from storage position to operating position, it is only necessary to lift the end of the stem extending past the walls 46 and 47 so that the stem is moved even further upwardly as the prong pivots until the prong is aligned with the opening 26 in the closure member and then to release the stem which is pulled downwardly in the barrel by the compression spring 41 so that the lower end of the stem extension 36 engages the upper surface of the material 14 in the barrel. In this upright position the stem extends substantially out of the barrel above the closure member 18. The compression spring 41 continues to urge the stem inwardly of the barrel and upon softening of the material 14 at elevated temperature the axial stem extension 36 will force the material 14 to flow upwardly about this extension 36 so that the stem slowly moves further into the barrel, as shown in FIG. 7. It is further noted in this respect that the conical portion 34 of the stem is provided with an indentation 35 in the tapered portion thereof immediately above the axial extension 36 of the stem. This indentation 35 may be employed as a return for an injection molded stem, inasmuch as any roughness at this portion of the stem will not interfere with operation of the thermometer. In addition, this indentation 35 provides a reservoir into which the plastic material 14 may flow as the stem extension 36 is forced into the barrel bore 13. Consequently, the axial extension 36 of the stem may be formed as a cylinder without grooves but having a diameter sufficiently less than the diameter of the bore 13 to allow softened material 14 to be forced upwardly alongside of the extension as the stem is urged further into the barrel at elevated temperature.

Adjacent the top of the stem there is preferably provided indicating means for indicating the degree to which meat and poultry has been cooked with the thermometer hereof inserted in the flesh thereof. These indicating means may, for example, be comprised as notches 51 and 52 spaced longitudinally from the upper end of the stem. With the appropriate material 14 provided in the thermometer, the lower notch 51 is positioned on the stem so as to be indicative of rare meat when the notch is aligned with the upper edge of the closure member 18. The upper notch 52 indicates medium well cooking of the meat when this notch is aligned with the upper edge of the closure member 18 and the top edge of the stem indicates that the meat is well done when it is aligned with the upper edge of the closure member 18. It will be appreciated that different materials 14 are employed to soften at the different temperatures for degrees of cooking of different meat or poultry to be cooked with the present invention. It is not normally necessary to provide indicating marks for thermometers employed with poultry, for example, inasmuch as most poultry is intended to be cooked to a single predetermined degree. On the other hand, beef is commonly cooked to different specifications as would be indicated by the indicating marks on the stem hereof. Different degrees of cooking of lamb, for example, would occur at different temperatures than beef and, consequently, a different material 14 would be employed for thermometers intended to be used for beef and lamb. Aside from the difference in the material 14, however, the same thermometer is employed for all poultry and meat.

In addition to the above-described portions of the present invention, it is herein provided that the device itself shall clearly display instructions for use. For many uses of the present invention, the thermometer is inserted prior to sale of the meat or poultry so that the housewife need only know how to operate the thermometer. The sole operation required by a cook to utilize the present thermometer which has been inserted in meat or poultry is to lift the stem. Inadvertent lifting or raising of the stem is precluded by the lateral extension of the top closure member 18 which entirely underlies the latched stem. In the circular portion of the closure member 18 opposite this lateral extension apertures are formed spelling "lift stem" and in accordance with the present invention the closure member is preferably made of a different color than the barrel of the flange 17 about the top thereof. Thus, for example, if the barrel and flange are white and the closure member 18 is blue, the instructions "lift stem" will clearly stand out by one using the thermometer. Obviously, alternative color combinations are also possible.

It will be appreciated that the structure of the present invention provides a positive latch mechanism for maintaining the indicating stem or rod in storage or latched position and furthermore provides protection for the stem in such position so that the stem will not be inadvertently moved from latched to operating position. In addition, the present invention provides clear instructions for placing the thermometer in operating position. There is also provided by the present invention an improved compression spring guide by means of the cylindrical bosses fitting into the ends of the spring interiorly of the barrel 11. Although it is possible to form the elements of the present invention out of various materials, it is advantageous to form the barrel, closure member and stem of a nylon plastic. These elements may be advantageously injection molded and in this respect it is furthermore noted that indentation 35 and the conical portion 34 of the stem provides an ideal location for plastic return during injection molding. This indentation furthermore provides a properly located reservoir for receiving material 14 as it is softened and forced from the bore 13 of the barrel. It will also, of course, be appreciated that the stem and barrel hereof are appropriately dimensioned so that the stem is, in fact, entirely drawn into the barrel by the spring 41 when the stem extension 36 reaches the bottom of the bore 13 and the barrel.

The present invention, as described above, is advantageous in that the structure may be inexpensively manufactured and is particularly desirable in use. The necessity of providing a latched or storage position for the thermometer hereof arises from the practice in the trade of inserting thermometers such as this into meat or poultry when same is prepared for shipping and sale. Such meat or poultry is normally covered as with a transparent plastic wrap and the stem of the present invention must lie flat or it would pierce this wrapping. The improved latching mechanism of the present invention positively maintains the thermometer in latched position and the lateral extent of the closure member and side walls thereon minimizes the possibility of inadvertent unlatching of the thermometer during processing or packaging of meat or poultry.

Although the present invention has been described with respect to a single preferred embodiment thereof, it will be apparent to those skilled in the art that numerous modifications are possible within the spirit and scope of the present invention and thus it is not intended to limit the invention to the precise terms of description or details of illustration.

What is claimed is:

1. In a disposable cooking thermometer having a hollow barrel with a resiliently flexible indicator stem spring loaded therein to move an outer end of the stem into the barrel as a material engaged by the stem in a closed end of the barrel softens at a predetermined temperature, an improved latch and barrel closure structure including a flange about a rear open end of said barrel and an integral prong centrally of the stem and pivotable outward of the stem as the latter is bent at a reduced cross section portion thereof to engage a closure member having an aperture aligned with the barrel opening and an indentation on an under side thereof and engaging said barrel flange in tight fitting relation therein with said closure member having a cutout spelling LIFT STEM therethrough above said barrel flange, and a lateral extension extending laterally outward of the barrel beneath the bent stem with ridges on said closure member alongside the stem is bent and latched position thereof with said lateral extension being of sufficient length to underly all of said stem that is bent over in latched position.

* * * * *